June 17, 1924.
A. L. MORRISON
SELF CLOSING LINE VALVE
Filed July 5, 1921
1,498,191
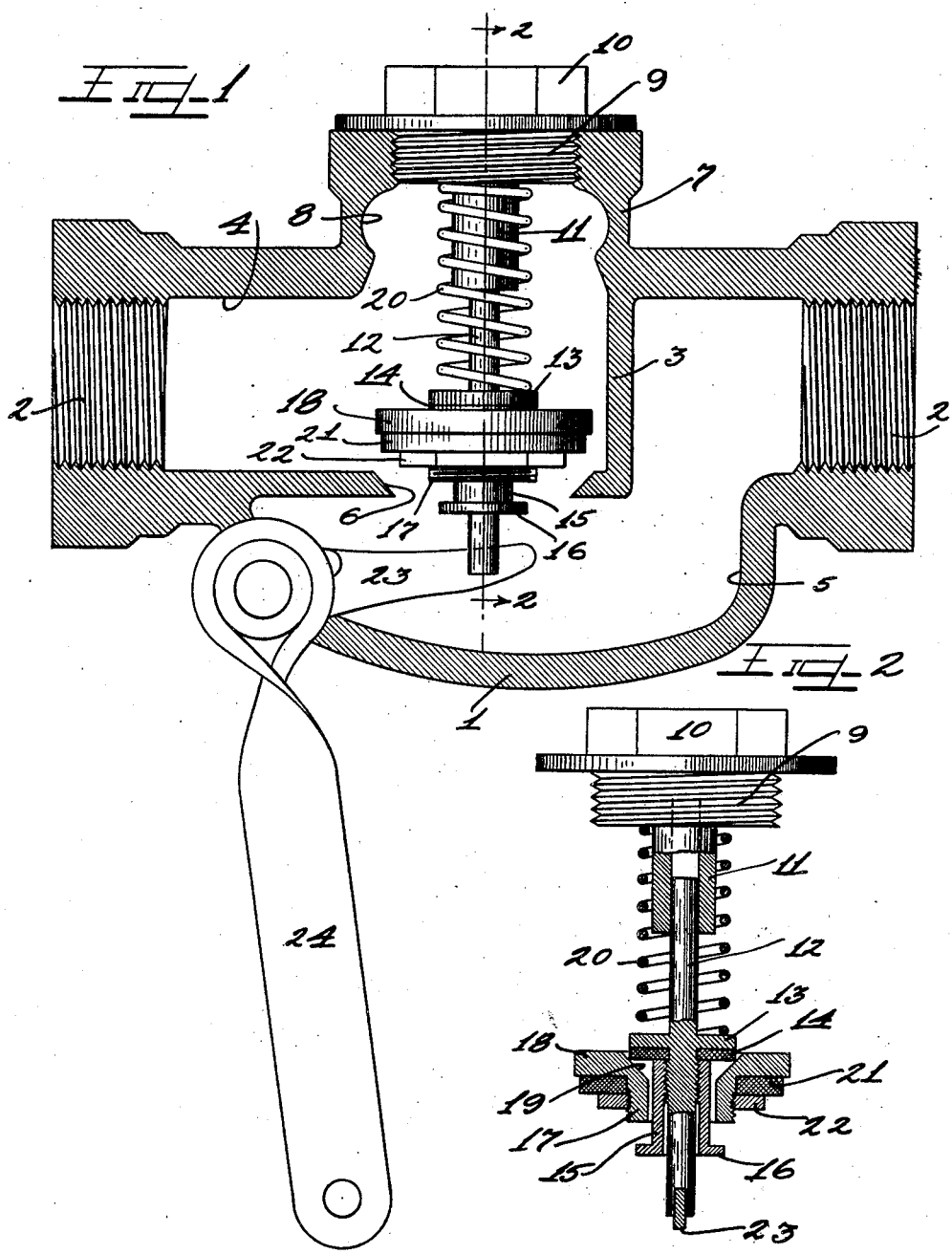

Patented June 17, 1924.

1,498,191

UNITED STATES PATENT OFFICE.

ABRAHAM L. MORRISON, OF DUBUQUE, IOWA.

SELF-CLOSING LINE VALVE.

Application filed July 5, 1921. Serial No. 482,417.

*To all whom it may concern:*

Be it known that I, ABRAHAM L. MORRISON, a citizen of the United States, and a resident of the city of Dubuque, in the county of Dubuque and State of Iowa, have invented certain new and useful Improvements in a Self-Closing Line Valve; and I do hereby declare that the following is a full, clear, and exact description of the same, reference being had to the accompanying drawings, and to the numerals of reference marked thereon, which form a part of this specification.

This invention relates more particularly to an improved type of a self-closing line valve wherein an auxiliary valve member coacting with a main valve member is adapted to be released first by operating a lever to relieve the high pressure, after which the main valve member is raised from the main valve seat to completely open the line valve.

It is an object of this invention to provide a self-closing line valve having a means for partially relieving the pressure to facilitate opening of the valve.

Another object of the invention is to provide a self-closing valve wherein a plurality of valve members of different sizes are adapted to be successively lifted by manually operable means to cause opening of the valve.

It is a further object of the invention to provide a spring-controlled valve having interfitting valve members of different sizes the smaller of which is adapted to be opened first to relieve the high pressure on the larger valve member to permit the same to be more readily opened.

It is an important object of this invention to provide a self-closing line valve of simple and effective construction wherein the main valve has an auxiliary pressure relief valve seated therein and adapted to be opened manually to partially relieve the pressure so that the main valve may be more readily lifted from its valve seat.

Other and further important objects of this invention will be apparent from the disclosures in the specification and drawings.

The invention (in a preferred form) is illustrated in the drawings and hereinafter more fully described.

On the drawings:

Figure 1 is a longitudinal central section of a self-closing line valve embodying the principles of this invention showing parts in elevation.

Figure 2 is a detail section taken on line 2—2 of Figure 1, with parts illustrated in elevation.

As shown in the drawings:

Numeral 1 indicates a valve housing or casing having the ends thereof internally threaded at 2 to permit line pipes to be engaged therein. An angled partition 3 is integrally formed in the valve housing 1 and divides the housing into an inlet chamber 4 and an outlet chamber 5. A main valve seat 6 is provided in the partition 3 and affords an opening connecting the two valve housing chambers 4 and 5. Integrally formed on the housing 1 is an arm 7 having a chamber 8 therein communicating with the valve inlet chamber 4. The arm 7 is internally threaded to receive the threaded shank 9 of a flanged plug 10. Integral with the plug shank 9 is an inwardly projecting guide sleeve 11 in which the upper end of a valve stem 12 is slidably engaged.

The valve stem 12 has integrally formed thereon a flange 13 below which an auxiliary valve disc 14 is engaged. The valve stem 12 is threaded below the flange 13 to permit a sleeve or collar 15 to be threaded thereon to hold the valve disc 14 in place against the lower surface of the flange 13. A flange 16 is integrally formed on the lower end of the sleeve 15. Slidably engaged on the sleeve 15 is an externally threaded collar 17 having a flange 18 integrally formed on the upper end thereof. A conical valve seat 19 is provided in the flange 18 against which the auxiliary valve disc 14 is adapted to seat. A coiled spring 20 is engaged around the plug sleeve 11 and around the upper portion of the valve stem 12. The spring 20 has the upper end contacting the plug shank 9, while the lower end rests on the stem flange 13 to hold the auxiliary valve disc 14 seated on the valve seat 19. A main valve disc 21 is held against the under surface of the flange 18 by means of a nut 22 threaded onto the collar 17. The lower end of the valve stem 12 is provided with a notch for receiving the free end of a finger or lever 23 pivotally mounted within the outlet chamber 5 of the valve housing. The lever 23 is connected with an external handle 24 to permit operation of said lever to cause opening of the valve.

The operation is as follows:

The valve is of the self-closing type having the spring 20 which acts to hold the small valve member 14 and the large valve member 21 seated against the respective valve seats 19 and 6, thereby closing the valve and shutting off communication between the valve chambers 4 and 5.

To open the valve against the high pressure in the chamber 4, the pressure is first slightly relieved by operating the handle 24 whereby the lever 23 is swung upwardly to slide the valve stem 12 upwardly against the action of the spring 20 and the pressure in the chamber 4. Upward movement of the valve stem 12 causes the auxiliary valve member or disc 14 to move upwardly from the valve seat 19, thereby partially opening the valve to relieve the great pressure upon the main valve member 21. As the auxiliary valve member is forced into open position the flange 16, which moves upwardly with the valve stem 12, is brought into contact with the lower end of the collar 17 and thus acts to raise the main valve member 21 off of the valve seat 6 to open communications between the valve chambers 4 and 5.

Upon release of the handle 24 the control spring 20 acts automatically to first move the auxiliary valve 14 against the valve seat 19 thereby causing the main valve 21 to seat upon the valve seat 6 to close the valve.

I am aware that numerous details of construction may be varied through a wide range without departing from the principles of this invention, and I therefore do not purpose limiting the patent granted otherwise than necessitated by the prior art.

I claim as my invention:

1. A valve comprising a housing, a partition therein, a main valve seat in said partition, a main valve member, an auxiliary valve seat in said main valve member, an auxiliary valve member, a spring for holding the auxiliary valve member seated in said auxiliary valve seat and causing the main valve member to seat in said main valve seat, a valve stem connected with said auxiliary valve member, a flanged sleeve on said stem projecting through said main valve member, means engaging said stem adapted to be operated to first cause opening of said auxiliary valve member and then opening of the main valve member by the flanged sleeve and a removable plug in said casing concentric with the main valve seat and provided with a hollow stem adapted to enter and support one end of the spring and to receive one end of said valve stem.

2. A valve comprising a housing, having inlet and outlet chambers at its ends, a partition comprising longitudinal and transverse portions, a main valve seat in the longitudinal portion of the partition, a main valve member, an auxiliary valve seat in said main valve member, an auxiliary valve member, a spring for holding the auxiliary valve member seated in said auxiliary valve seat and causing the main valve to seat in said main valve seat, a valve stem connected with said auxiliary valve member, a flanged sleeve on said stem projecting through said main valve member, a removable plug in said casing concentric with said valve seat, a hollow stem on said plug adapted to enter the spring and to receive the said valve stem, and means engaging said valve stem adapted to be operated to first cause opening of said auxiliary valve member and then opening of the main valve member by the flanged sleeve.

In testimony whereof I have hereunto subscribed my name in the presence of two subscribing witnesses.

ABRAHAM L. MORRISON

Witnesses:
J. C. WALKER,
A. J. KASEL.